US012593939B2

(12) United States Patent
Lee et al.

(10) Patent No.: US 12,593,939 B2
(45) Date of Patent: Apr. 7, 2026

(54) PORTABLE DIRECT-FIRED COOKER

(71) Applicant: Fiber Tech CO., LTD, Paju-si (KR)

(72) Inventors: Seyoung Lee, Seoul (KR); Jonghun Woo, Paju-si (KR); Daehee Kim, Paju-si (KR); Hyojong Gil, Paju-si (KR); Duckeuy Lee, Goyang-si (KR); Taekheon Lee, Goyang-si (KR)

(73) Assignee: FIBERTECH CO., LTD (KR)

( * ) Notice: Subject to any disclaimer, the term of this patent is extended or adjusted under 35 U.S.C. 154(b) by 467 days.

(21) Appl. No.: 17/925,311

(22) PCT Filed: May 11, 2021

(86) PCT No.: PCT/KR2021/005840
§ 371 (c)(1),
(2) Date: Nov. 14, 2022

(87) PCT Pub. No.: WO2021/230603
PCT Pub. Date: Nov. 18, 2021

(65) Prior Publication Data
US 2023/0233023 A1 Jul. 27, 2023

(30) Foreign Application Priority Data

May 12, 2020 (KR) ........................ 10-2020-0056280

(51) Int. Cl.
*A47J 37/07* (2006.01)

(52) U.S. Cl.
CPC ....... *A47J 37/0763* (2013.01); *A47J 37/0713* (2013.01); *A47J 37/0786* (2013.01); *A47J 2037/0795* (2013.01)

(58) Field of Classification Search
CPC ................ A47J 37/0763; A47J 37/0713; A47J 37/0786; A47J 2037/0795; A47J 37/0694; A47J 37/0682; A47J 37/0688; A47J 2037/0617; A47J 37/0727; Y02A 40/928
USPC .......................................................... 126/1 R
See application file for complete search history.

(56) References Cited

U.S. PATENT DOCUMENTS

2017/0130966 A1* 5/2017 Barajas ................... F24B 13/02

FOREIGN PATENT DOCUMENTS

| KR | 101464629 | B1 | * | 11/2014 | ........... | H05B 1/0258 |
| KR | 200477329 | Y1 | * | 6/2015 | | |
| KR | 101686379 | B1 | * | 12/2016 | .......... | A47J 37/0605 |
| KR | 101720898 | B1 | * | 3/2017 | .......... | A47J 37/0611 |

(Continued)

OTHER PUBLICATIONS

KR 101464629 with Machine Translation (Year: 2014).*

(Continued)

*Primary Examiner* — Allen R. B. Schult
*Assistant Examiner* — Amy E Carter
(74) *Attorney, Agent, or Firm* — Renaissance IP Law Group LLP

(57) ABSTRACT

Disclosed herein is a portable direct-fired cooker including a lower case supporting a roasting plate mounted at an upper portion thereof and an upper case spaced apart from the lower case and including a heater module emitting a flame ignited upon receiving gas toward the lower case, wherein the upper case includes a plurality of heat dissipation grooves penetrating through the upper case, by which a burner structure of a top-down portable direct-fired cooker is protected from convection heat.

5 Claims, 8 Drawing Sheets

(56)         References Cited

FOREIGN PATENT DOCUMENTS

KR        101829240  B1 *   2/2018   .......... A47J 37/0745
KR        101963544  B1 *   3/2019   ............. F24C 3/085

OTHER PUBLICATIONS

KR 200477329 with Machine Translation (Year: 2015).*
KR 101720898 with Machine Translation (Year: 2017).*
Machine Translation of KR 101686397 (Year: 2016).*
Machine Translation of KR101963544 (Year: 2019).*
KR 101829240 with Machine Translation (Year: 2018).*

* cited by examiner

PORTABLE DIRECT-FIRED COOKER

TECHNICAL FIELD

The present disclosure relates to a portable direct-fired cooker that is portable and easily bakes and heats a roasted material indoors and outdoors.

BACKGROUND ART

In general, cookers are devices for cooking a roasted material with heat, and are classified into a direct heating type using a flame of gas and charcoal and an indirect heating type using electricity according to a method of providing heat.

For example, in the case of a direct-fired cooker using charcoal among the direct heating types, it may be difficult to control a size of a flame, so the inside of a roasted material is not cooked properly while only the outside is burned and ash and soot scatter during combustion, and thus, as a solution, a direct-fired cooker using butane gas has been proposed.

That is, the direct-fired cooker using butane gas has the advantage of easy flame control, but in most cookers, flames are generated below a roasting plate on which meat is put, so that smoke or toxic gas occurs when juice or oil generated by the roasted material falls, and during roasting, the roasted material may be easily pressed to a roasting plate, which causes burning of the roasted material.

In order to solve the problems, a top-down type cooker in which a flame is generated from the top has been proposed, including the 'Portable direct-fired cooker' of Korean Patent Laid-Open No. 10-2012-0083169 (published on Jul. 25, 2012), the 'Table-mounted and portable direct-fired cooker and warmer' of Korean Patent Registration No. 10-1454356 (published on Oct. 23, 2014), the 'Two-way cooker with a roasting table elevating structure' of Korean Patent Laid-Open No. 10-2014-0146882 (published on Dec. 29, 2014) and Registration No. 10-1715572 (published on Mar. 22, 2017), etc.

These top-down cookers resolve the problems in which juice or oil generated by a roasted material falls to cause smoke and toxic gas and the roasted material is easily pressed to a roasting plate during roasting, and in order to resolve a problem of a long roasting time, which is a problem of the top-down roasters, a lift is installed so that a height of the roasting plate may be adjusted, but the structure is complicated and bulky, resulting in inconvenient portability and being limited to cooking using a roasting plate.

Furthermore, since a top-down burner is disposed on the top of the roasting plate, the burner structure is vulnerable to heat due to convection heat.

In addition, the burner structure may be made of a lightweight metal material for portability, and in this case, there is a risk of damage to the direct-fired cooker and personal injury due to convective heat more directly.

The above information disclosed in this Background section is only for enhancement of understanding of the background of the invention, and therefore it may contain information that does not form the prior art that is already known in this country to a person of ordinary skill in the art.

RELATED ART DOCUMENT

[Patent Document]
(Patent document 0001) Korean Patent Registration No. 10-1686379 (published on Dec. 13, 2016)

(Patent document 0002) Korean Patent Registration No. 10-1454356 (published on Oct. 23, 2014)
(Patent document 0003) Korean Patent Registration No. 10-1564624 (Notice on Nov. 2, 2015)
(Patent document 0004) Korean Patent Registration No. 10-1715572 (published on Mar. 22, 2017)
(Patent document 0005) Korean Patent Registration No. 10-1686379 (published on Dec. 13, 2016)

DISCLOSURE

Technical Problem

An aspect of the present disclosure is to provide a portable direct-fired cooker that allows a burner structure of a top-down portable direct-fired cooker to be protected from convection heat.

Technical Solution

In an aspect, a portable direct-fired cooker includes: a lower case supporting a roasting plate mounted at an upper portion thereof; and an upper case spaced apart from the lower case and including a heater module emitting a flame ignited upon receiving gas toward the lower case, wherein the upper case includes a plurality of heat dissipation grooves penetrating through the upper case.

The plurality of heat dissipation grooves may include a front heat dissipation groove formed on a front surface of the upper case and a side heat dissipation groove formed on a side surface of the upper case.

Here, the side heat dissipation groove may extend from both sides of the upper case in a longitudinal direction of the upper case.

In addition, a plurality of groove frames may be formed in a height direction of the upper case on the front surface of the upper case and spaced apart from each other, and the front heat dissipation groove may be formed between the groove frames.

Meanwhile, the portable direct-fired cooker may further include a head heat dissipation plate coupled to the upper case.

In addition, the head heat dissipation plate may be coupled to both edges where a lower surface and a side surface of the upper case meet, and may be coupled to partially cover the lower surface and the side surface of the upper case.

In addition, the head heat dissipation plate may be formed of a stainless steel material.

Furthermore, the portable direct-fired cooker may further include a lift unit provided inside the lower case elevating the roasting plate.

Advantageous Effects

According to the portable direct-fired cooker of the present disclosure, a burner structure may be protected from heat by allowing convective heat generated by a burner head to be smoothly dissipated to the front and side of the burner structure.

In addition, by configuring a head heat dissipation plate at a lower edge of the burner structure in a longitudinal direction of the burner structure, convective heat generated downward of the burner structure may be rapidly convected to the side, thereby protecting the burner structure.

3

Figure 3:
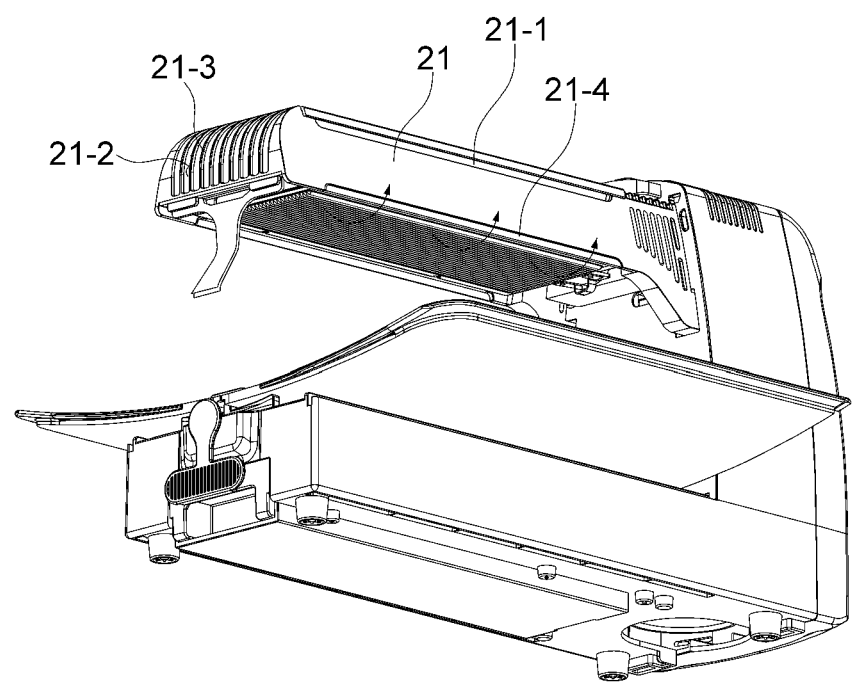

FIG. 3 is a bottom perspective view of a portable direct-fired cooker of the present disclosure.

Figure 4:
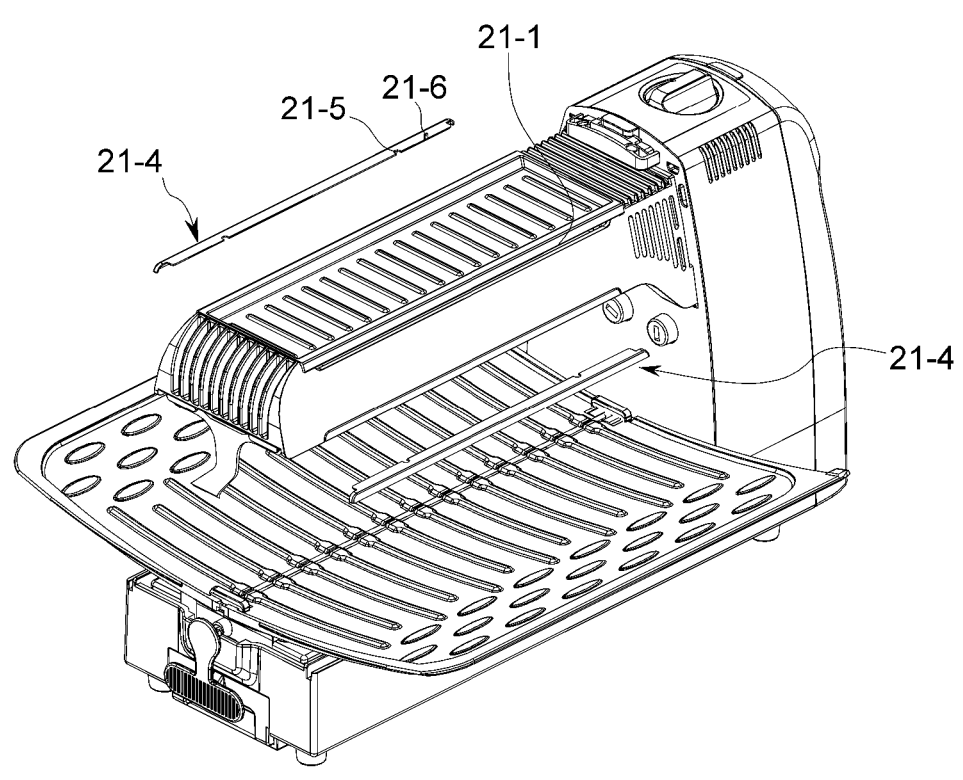

FIG. 4 is a separate view showing a configuration of a portable direct-fired cooker of the present disclosure.

Figure 5:
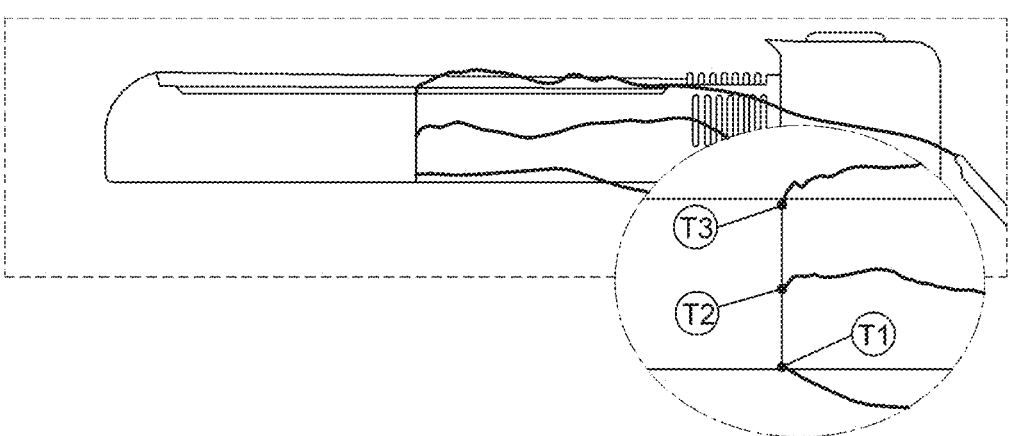
Figure 6:
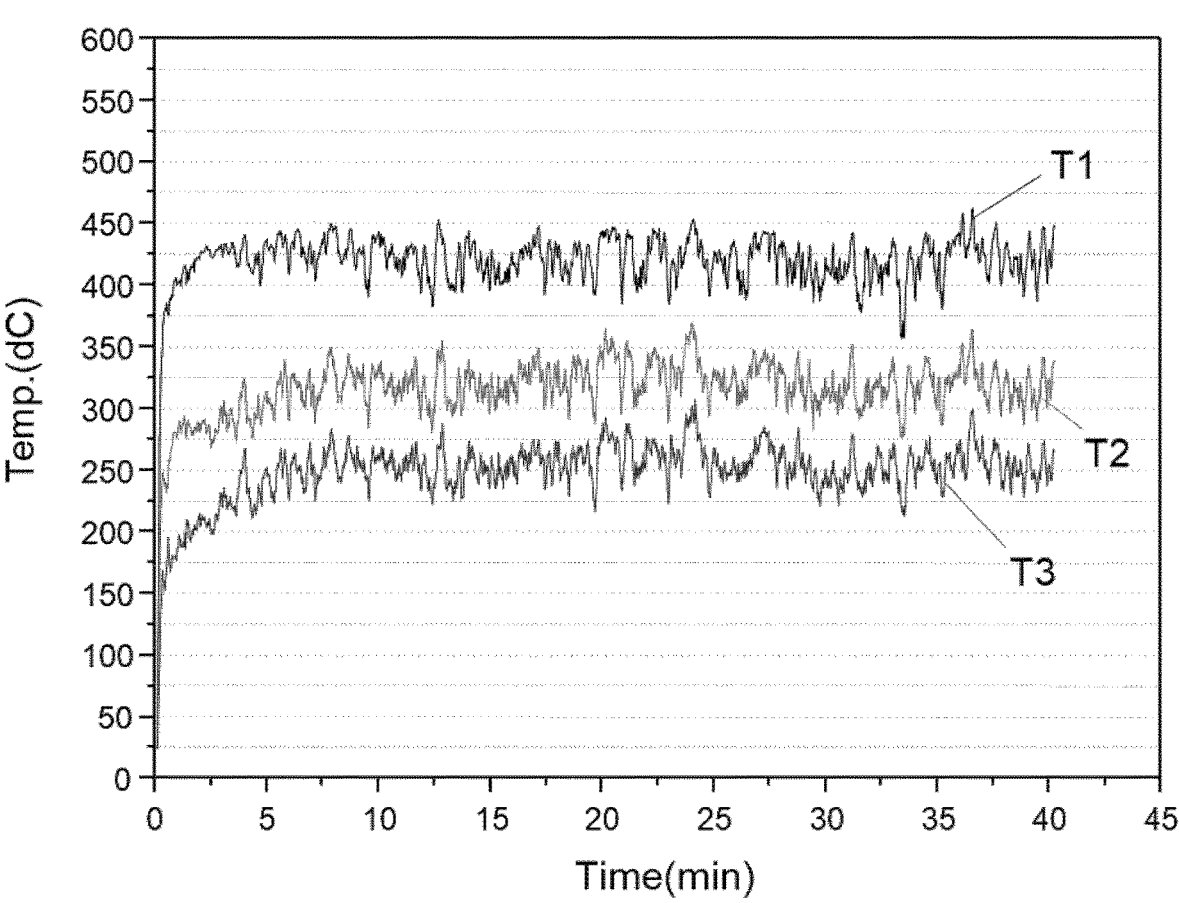

FIG. 5 is an experimental photograph of a portable direct-fired cooker of the related art, and FIG. 6 is a thermal measurement result.

Figure 7:
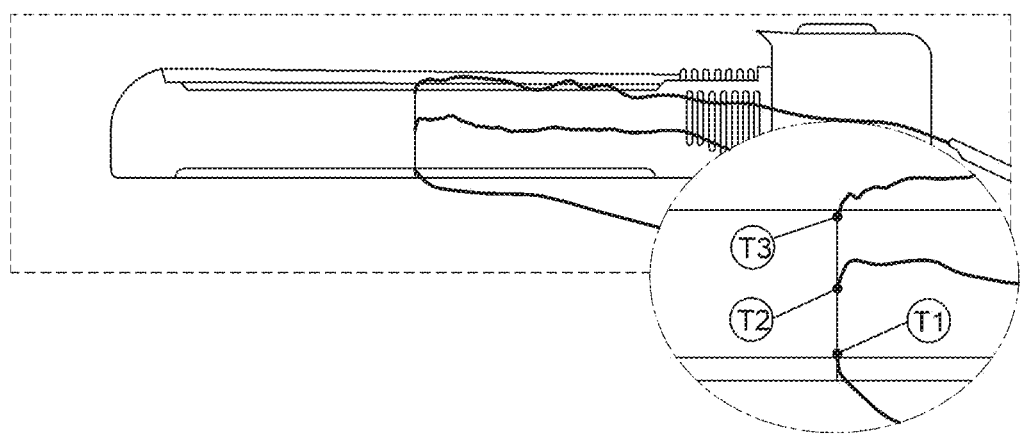
Figure 8:
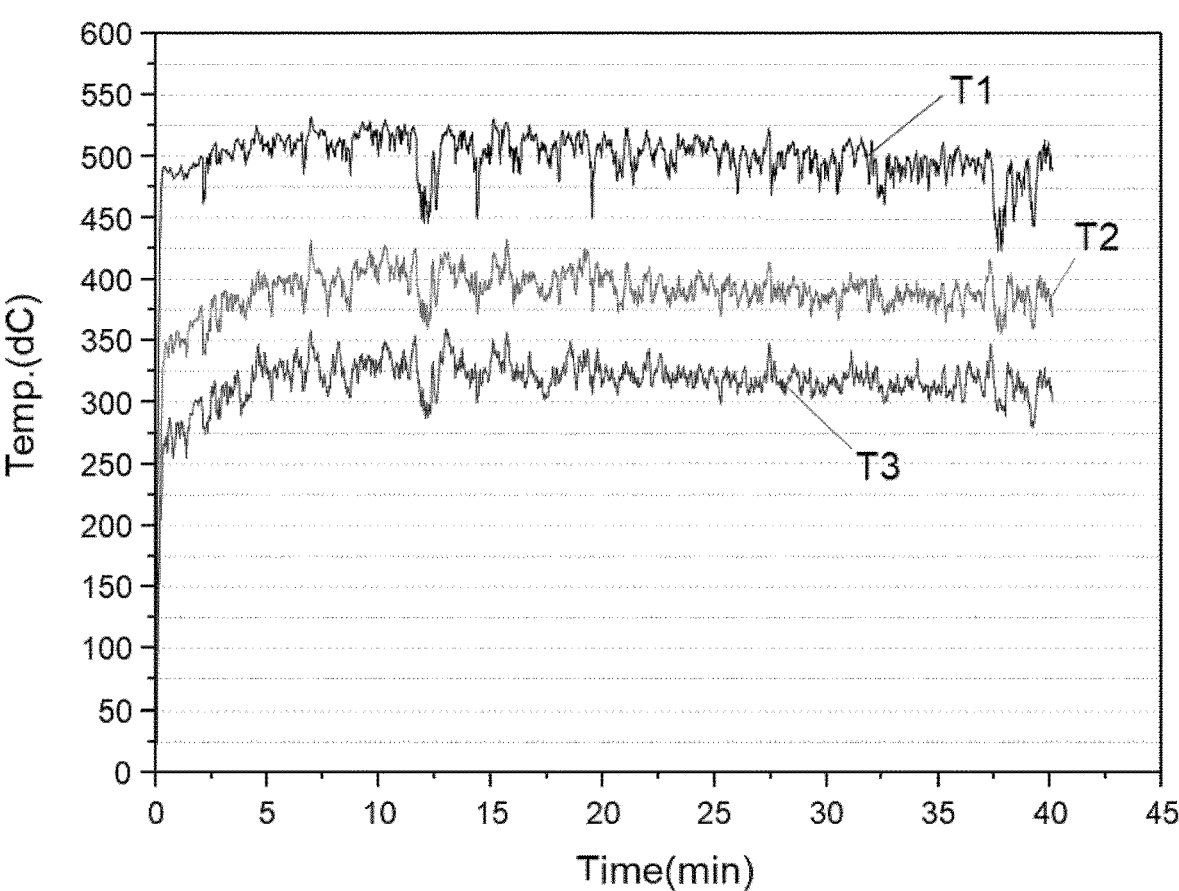

FIG. 7 is an experimental photograph of a portable direct-fired cooker of the present disclosure; and FIG. 8 is a thermal measurement result.

BEST MODE

In order to fully understand the present disclosure, the operational advantages of the present disclosure, and the objects achieved by the practice of the present disclosure, reference should be made to the accompanying drawings illustrating embodiments of the present disclosure and the contents described in the accompanying drawings.

In describing embodiments of the present disclosure, well-known technologies or repetitive descriptions that may unnecessarily obscure the gist of the present disclosure may be reduced or omitted.

Figure 1:
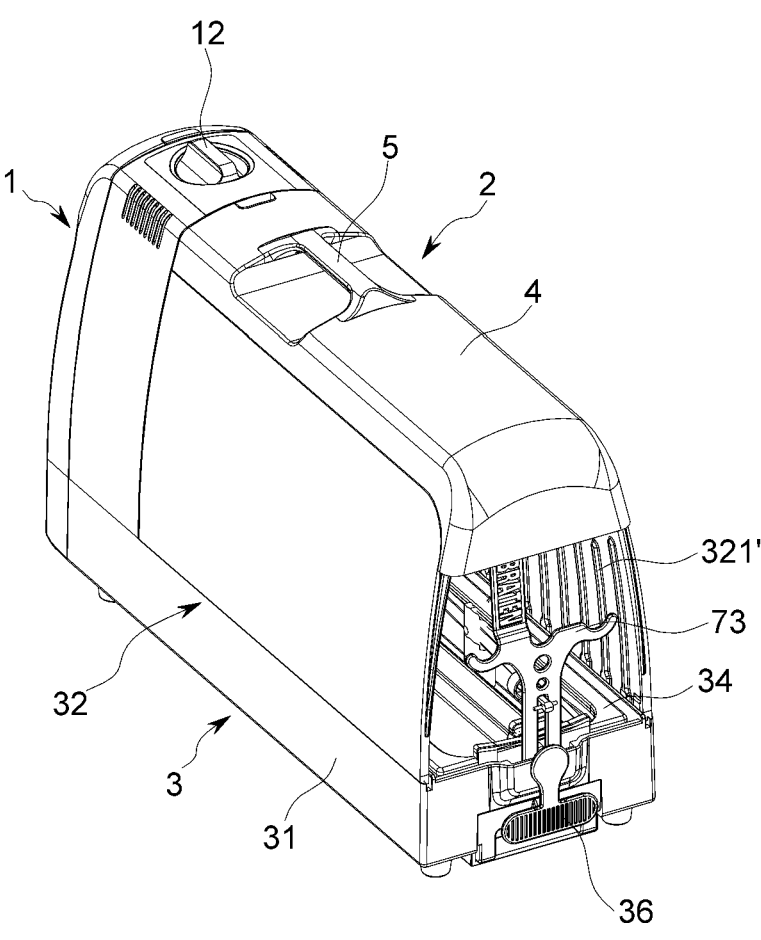
FIGS. 1 and 2 show a coupled and separated state of a portable direct-fired cooker of the present disclosure.
Figure 2:
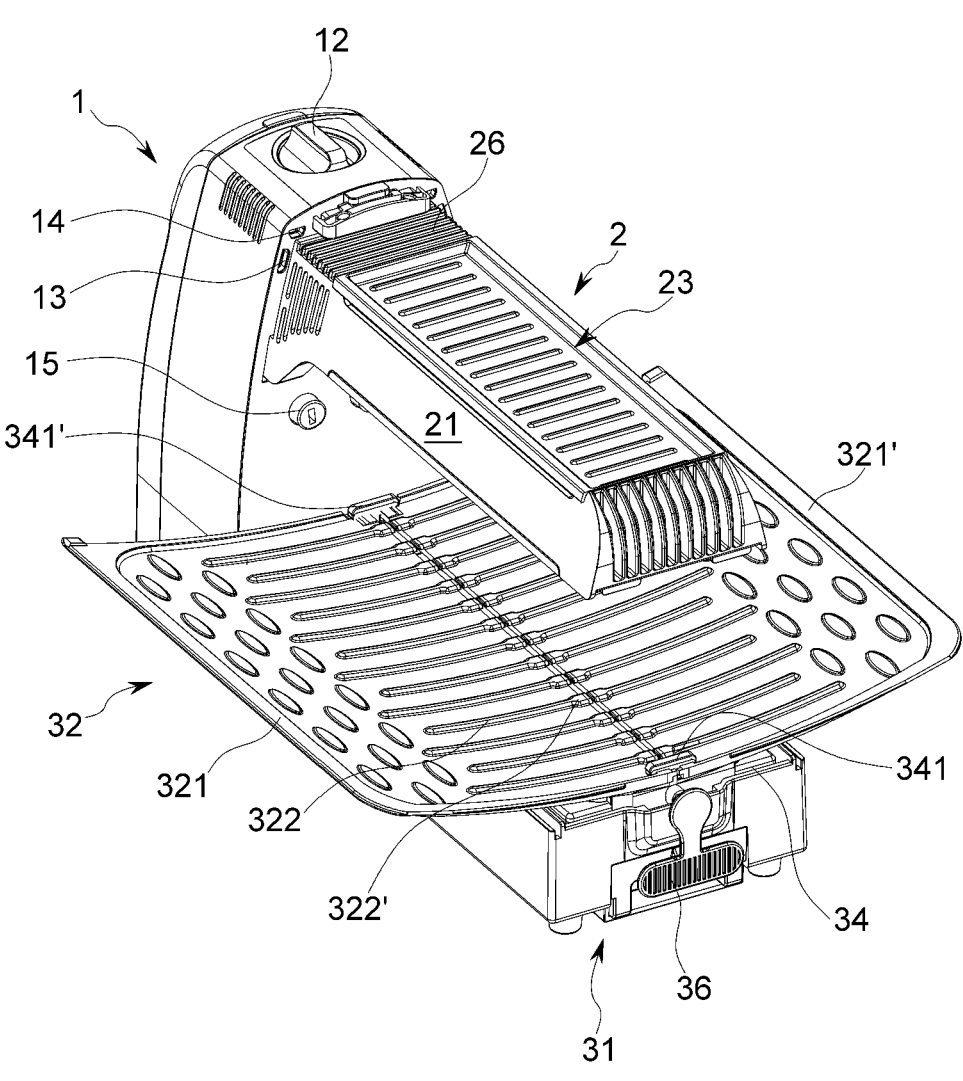

FIGS. 1 and 2 show a coupled and separated state of a portable direct-fired cooker of the present disclosure. FIG. 3 is a bottom perspective view of a portable direct-fired cooker of the present disclosure, and FIG. 4 is a separate view showing a configuration of a portable direct-fired cooker of the present disclosure.

Hereinafter, a portable direct-fired cooker according to an embodiment of the present disclosure will be described with reference to FIGS. 1 to 4.

A portable direct-fired cooker of the present disclosure includes a gas supply unit 1 accommodating a butane gas container in an accommodation chamber formed at an upper portion of a rear end of a lower case 31 and discharging a butane gas through an adjustment valve 12, a flame unit 2 including a heater module downwardly emitting a flame heat generated by discharging and burning a butane gas that is discharged through the gas supply unit 1 to a lower side of the upper case 21 toward a lower case 31 of a roasting unit 3, a thermal insulation container 23 introduced to an open portion by opening the upper case 21 and mounted at an upper end of the heater module to heat a roasted material with naturally rising heat emitted by the heater module, a roasting plate 32 bisected into left and right plates 321 and 321', including a plurality of ribs 322 protruding to discharge oil on an upper roasting surface to provide an oil drop space between protruding pieces 322' of the rib 322 portion in which the left and right plates 321 and 321' are in contact with each other so that the protruding piece 322' and a first fixing protrusion protruding from an upper end of a side surface of the left and right plates 321 and 321' are inserted into and coupled to a guide groove formed at both ends of an upper side of the lower case 31 and a first fixing hole 13 formed at an upper side of the gas supply unit 1 to serve as a horizontal cover, a holder 73 having a lower portion inserted into an upper end of a stop portion of the lower case 31 and forming a semicircular recess at an upper portion to support a stand and the other end of the roasting container, a lid 4 having a guide groove at both ends of a lower side and including a second fixing protrusion and a third fixing protrusion formed inside a rear end and a front end so as to be inserted into and coupled to a second fixing hole 14 formed at both ends of an upper side of the gas supply unit 1, an engagement hole formed at a front end of the upper case 21, and a guide protrusion protruding from both ends, and a handle 5 having first and second hinges protruding from both ends so as to be inserted into and rotated in the lid 4.

In addition, a support frame 34 on which an oil receiver and the left and right plates 321 and 321' and the roasting plate 32 are mounted is lifted and lowered by the lift unit to bring a roasted material to become closer to or separated from the heater module.

A more specific object of the present disclosure is to enable the upper case 21 of the top-down portable direct-fired cooker to be protected from convection heat.

Accordingly, in the present disclosure, a plurality of heat dissipation grooves are formed in the upper case 21 so that heat from the heater module inside the upper case 21 may be dissipated to the outside through the heat dissipation grooves.

The heat dissipation grooves include a side heat dissipation groove 21-1 and a front heat dissipation groove 21-2.

The side heat dissipation grooves 21-1 are formed on both sides of the upper case 21 to extend in a longitudinal direction of the upper case 21, and serve to dissipate heat to both sides of the upper case 21.

In addition, the front heat dissipation groove 21-2 is formed on the front surface of the upper case 21. That is, a groove frame 21-3 is formed on the front surface of the upper case 21 in a height direction of the upper case 21, and a space is provided between the groove frames 21-3 to form the front heat dissipation groove 21-2.

As a result, heat is dissipated through the front of the upper case 21.

Furthermore, the present disclosure further includes a head heat dissipation plate 21-4 coupled to the upper case 21.

That is, the head heat dissipation plate 21-4 referenced in FIGS. 4 and 5 is coupled to both edges where the lower surface and the side surface of the upper case 21 meet, and is coupled to cover a portion of the lower surface and a portion of the side surface.

Accordingly, as shown, the head heat dissipation plate 21-4 may be coupled in a direction parallel to the longitudinal direction of the upper case 21 and may have a bent shape, and a coupling groove 21-5 or coupling protrusion 21-6 for coupling with the upper case 21 may be formed.

Furthermore, the head heat dissipation plate 21-4 is more preferably formed of stainless steel.

By configuring such a head heat dissipation plate 21-4, heat generated by the heater module may be more efficiently dissipated to the side of the upper case 21 along the head heat dissipation plate 21-4, so that the upper case 21 may be prevented from being directly exposed to heat.

FIGS. 5 to 8 are experimental results supporting this, FIG. 5 is an experimental photograph of a portable direct-fired cooker of the related art, FIG. 6 is a thermal measurement result, FIG. 7 is an experimental photograph of a portable direct-fired cooker of the present disclosure, and FIG. 8 is a thermal measurement result. The results are summarized in Table 1.

TABLE 1

|  | Related art | Present disclosure | Heat dissipation effect (ΔT) |
|---|---|---|---|
| T1 (° C.) | 419.7 | 499.7 | −80.0 |
| T2 (° C.) | 316.5 | 389.9 | −73.4 |
| T3 (° C.) | 249.1 | 317.1 | −68.1 |

As such, in the case of the portable direct-fired cooker of the present disclosure having a head heat dissipation plate, a heat dissipation effect of up to 80° C. may be confirmed, compared to the related art, and thus, durability of the upper case formed of aluminum may be secured.

Although the embodiments of the present disclosure have been illustrated and described hereinabove, the present disclosure is not limited to the specific exemplary embodiments described above, but may be variously modified by those skilled in the art to which the present disclosure pertains without departing from the scope and spirit of the present disclosure as disclosed in the accompanying claims. These modifications should also be understood to fall within the scope of the present disclosure.

DESCRIPTION OF REFERENCE NUMERALS

1: gas supply unit
12: adjustment valve
13: first fixing hole
14: second fixing hole
15, 15': engagement hole
2: flame unit
21: upper case
23: thermal insulation container
3: roasting unit
31: lower case
32: roasting plate
321, 321': left and right plates
322: rib
322': protruding piece
34: support frame
341, 341': hanger loop
36: operating lever
4: lid
5: handle
73: holder
21-1: side heat dissipation groove
21-2: front heat dissipation groove
21-3: groove frame
21-4: head heat dissipation groove
21-5: coupling groove
21-6: coupling protrusion

The invention claimed is:

1. A portable direct-fired cooker comprising:
   a lower case supporting a roasting plate mounted at an upper portion thereof;
   an upper case spaced apart from the lower case and including a heater module emitting a flame ignited upon receiving gas toward the lower case; and
   a head heat dissipation plate coupled to the upper case,
   wherein the upper case includes a plurality of heat dissipation grooves penetrating through the upper case,
   wherein the plurality of heat dissipation grooves include a front heat dissipation groove formed on a front surface of the upper case and a side heat dissipation groove formed on a side surface of the upper case,
   wherein the head heat dissipation plate comprises plates, wherein each respective plate is arranged at and coupled to a respective edge where a lower surface and a respective side surface of the upper case meet, partially covers the lower surface and the side surface of the upper case, and is located between the upper case and the lower case supporting the roasting plate.

2. The portable direct-fired cooker of claim 1, wherein the side heat dissipation groove extends from both sides of the upper case in a longitudinal direction of the upper case.

3. The portable direct-fired cooker of claim 1, wherein a plurality of groove frames are formed in a height direction of the upper case on the front surface of the upper case and spaced apart from each other, and the front heat dissipation groove is formed between the groove frames.

4. The portable direct-fired cooker of claim 1, wherein the head heat dissipation plate is formed of a stainless steel material.

5. The portable direct-fired cooker of claim 1, further comprising:
   a lift unit provided inside the lower case elevating the roasting plate.

* * * * *